United States Patent
Simi

(10) Patent No.: US 9,065,272 B2
(45) Date of Patent: Jun. 23, 2015

(54) SCALABLE POWER SUPPLY CIRCUIT INCLUDING PROTECTION FEATURES

(71) Applicant: Victor M. Simi, Lexington, KY (US)

(72) Inventor: Victor M. Simi, Lexington, KY (US)

(73) Assignee: OSRAM SYLVANIA Inc., Danvers, MA (US)

( * ) Notice: Subject to any disclaimer, the term of this patent is extended or adjusted under 35 U.S.C. 154(b) by 138 days.

(21) Appl. No.: 13/781,825

(22) Filed: Mar. 1, 2013

(65) Prior Publication Data

US 2014/0247522 A1    Sep. 4, 2014

(51) Int. Cl.
  *H02H 9/06* (2006.01)
  *H02H 5/04* (2006.01)
  *H05B 33/08* (2006.01)

(52) U.S. Cl.
  CPC .............. *H02H 5/042* (2013.01); *H02H 9/06* (2013.01); *H05B 33/0884* (2013.01)

(58) Field of Classification Search
  USPC ..................................................... 361/18, 24
  See application file for complete search history.

(56) References Cited

U.S. PATENT DOCUMENTS

| | | | | |
|---|---|---|---|---|
| 4,331,999 | A * | 5/1982 | Engel et al. ................... | 361/94 |
| 2005/0269974 | A1* | 12/2005 | Ravindra et al. .............. | 315/308 |
| 2007/0052373 | A1 | 3/2007 | Hui et al. | |
| 2008/0122364 | A1* | 5/2008 | McClellan ..................... | 315/51 |
| 2013/0049589 | A1 | 2/2013 | Simi | |
| 2013/0342027 | A1* | 12/2013 | Tsai et al. ..................... | 307/104 |

FOREIGN PATENT DOCUMENTS

EP    2 477 459 A1    7/2012

OTHER PUBLICATIONS

Claudio Adragna, AN966 Application Note—L6561 Enhanced Transition Mode Power Factor Corrector, Oct. 2001, pp. 1-20, STMicroelectronics, Italy.
L6562 Transition-Mode PFC Controller, Rev. 8, Nov. 2005, pp. 1-16, STMicroelectronics, United States of America.
AN3106 Application Note 48V—130W high-efficiency converter with PFC for LED street lighting applications, Rev. 1, Sep. 2010, pp. 1-35, STMicroelectronics, United States of America.
Philippe Grosse, International Search Report and Written Opinion of the International Searching Authority for PCT/US2014/019977, Mar. 13, 2015, pp. 1-9, European Patent Office, Rijswijk, The Netherlands.

* cited by examiner

*Primary Examiner* — Thienvu Tran
*Assistant Examiner* — Angela Brooks
(74) *Attorney, Agent, or Firm* — Shaun P. Montana

(57) ABSTRACT

A power supply circuit and method for supplying power are provided. The power supply circuit includes a front end circuit, a power factor correction circuit, and a drive circuit. The front end circuit is configured to generate a direct current voltage based on an input voltage. The front end circuit includes a first surge protection circuit. The power factor correction circuit is configured to generate a driving voltage based on the generated direct current voltage. The power factor correction circuit includes a second surge protection circuit and an over-temperature protection circuit. The drive circuit is configured to generate an output voltage for a load based on the driving voltage. The drive circuit includes a third surge protection circuit, a startup circuit, and an open-circuit protection circuit.

16 Claims, 5 Drawing Sheets

SCALABLE POWER SUPPLY CIRCUIT INCLUDING PROTECTION FEATURES

TECHNICAL FIELD

The present invention relates to lighting, and more specifically, to power supply circuits for solid state light sources.

BACKGROUND

Designing a power supply circuit requires that some consideration be given to both the technical requirements and safety requirements for the application in which the power supply circuit will be used. For technical requirements, the power requirements of the load should be taken into account, so that the power supply circuit drives the load reliably, efficiently and safely. While reliability has always been a concern, efficiency is becoming more of an issue in view of emerging applications such as powering loads from batteries (e.g., mobile devices), powering loads from generators such as solar power arrays, reactive chemical cells, etc. The load must be driven in a manner that is safe: to operators, to the load, and to the power supply circuit. For example, many existing and emerging power supply applications require protection from power surge events (e.g., electrostatic discharge (ESD), lightning strikes, etc.), system malfunction and/or damage due to input power fluctuations, unexpected systemic failures (e.g., due to short circuits or open circuits that occur in the power supply circuitry or across the load), etc. To account for these technical and safety requirements, it is often necessary for a power supply circuit to be redesigned "from scratch" in view of each application, necessitating the expenditure of a significant amount of time and design resources.

SUMMARY

Embodiments of the present invention provide a scalable power supply circuit and methods for supplying power that include protection features. In some embodiments, a power supply circuit includes a front end circuit, a power factor correction (PFC) circuit, and a drive circuit. The front end circuit, the power factor correction circuit, and the drive circuit, in some embodiments, all include a respective surge protection circuit. The PFC circuit, in some embodiments, includes an over-temperature protection circuit. The drive circuit, in some embodiments, includes a startup circuit and an open-circuit protection circuit. In some embodiments, one or more of these components is present in addition to a surge protection circuit. In some embodiments, the surge protection circuit is one or more gas discharge tubes. In the front end circuit, the one or more gas discharge tubes in some embodiments are configured to couple a first input line voltage to a second input line voltage, and each of the first and second input line voltages to ground. In the PFC circuit, in some embodiments, the one or more gas discharge tubes are configured to prevent surges in the driving voltage, while in the drive circuit, in some embodiments, the one or more gas discharge tubes are configured to prevent surges in the output voltage.

In some embodiments, the power factor correction circuit and the drive circuit include a controller. The controller in the PFC circuit (e.g., the PFC circuit controller) and the controller in the drive circuit (e.g., the drive circuit controller) may be, and in some embodiments are, configured the same and have the same pin-out configuration. The PFC circuit and drive circuit may be, and in some embodiments are, disabled by coupling a disable pin in either of the controllers to ground.

This functionality may be employed in protective features present in the power supply circuit. For example, in some embodiments, the over-temperature protection circuit includes a temperature-sensitive component and a transistor, the temperature-sensitive component being configured to disable the power factor correction circuit by causing the transistor to couple the disable pin of the power factor correction circuit controller to ground when the temperature-sensitive component is at a temperature above the maximum allowed temperature. In some embodiments, the startup circuit includes a diode (e.g., a zener diode) and a transistor, the diode being configured to disable the drive circuit by causing the transistor to couple the disable pin of the drive controller to ground until the driving voltage reaches a threshold voltage. In some embodiments, the open-circuit protection circuit includes a diode (e.g., a zener diode) and an optical isolator (optoisolator), the diode being configured to disable the drive circuit by causing the optoisolator to couple the disable pin in the drive controller to ground if an open circuit is detected across the load. In some embodiments, the output voltage of the power supply circuit is altered by replacing one of a first power resistor in the power factor correction circuit and replacing a second power resistor in the drive circuit.

In an embodiment, there is provided a power supply circuit. The power supply circuit includes: a front end circuit configured to generate a direct-current (DC) voltage based on an input voltage, wherein the front end circuit includes a first surge protection circuit; a power factor correction (PFC) circuit configured to generate a driving voltage based on the DC voltage, wherein the PFC circuit includes a second surge protection circuit and an over-temperature protection circuit; and a drive circuit configured to generate an output voltage for a load based on the driving voltage, wherein the drive circuit includes a third surge protection circuit, a startup circuit, and an open-circuit protection circuit.

In a related embodiment, the first surge protection circuit, the second surge protection circuit, and the third surge protection circuit may each include one or more gas discharge tubes. In a further related embodiment, the input voltage may be an alternating current (AC) voltage, and the one or more gas discharge tubes may be configured to couple a first input line voltage to a second input line voltage and each of the first input line voltages and the second input line voltages to ground. In another related embodiment, the one or more gas discharge tubes in the PFC circuit may be configured to prevent surges in the drive voltage and the one or more gas discharge tubes in the drive circuit may be configured to prevent surges in the output voltage.

In another related embodiment, the over-temperature protection circuit may be configured to disable the PFC circuit when a temperature associated with the over-temperature protection circuit increases above a maximum allowed temperature. In a further related embodiment, the over-temperature protection circuit may include a temperature-sensitive component and a transistor, wherein the temperature-sensitive component may be configured to cause the transistor to couple a disable input of a controller in the PFC circuit to ground when the temperature-sensitive component is at a temperature above the maximum allowed temperature.

In yet another related embodiment, the startup circuit may be configured to prevent activation of the drive circuit until the driving voltage reaches a threshold voltage. In a further related embodiment, the startup circuit may include a diode and a transistor, and the diode may be configured to cause the transistor to couple a disable input of a controller in the drive circuit to ground until the driving voltage reaches the threshold voltage.

In still another related embodiment, the open-circuit protection circuit may be configured to disable the drive circuit when an open circuit is detected across the load. In a further related embodiment, the open-circuit protection circuit may include a diode and an optical isolator, and the diode may be configured to cause the optical isolator to couple a disable input of a controller in the drive circuit to ground when an open circuit is detected across the load.

In yet still another related embodiment, the PFC circuit and the drive circuit each may include a controller component. In a further related embodiment, the controller component in the PFC circuit and the controller component in the drive circuit may each be configured the same and each may have the same pin-out configuration.

In another embodiment, there is provided a method. The method includes: receiving power in a power supply circuit, wherein the power supply circuit includes a drive circuit; producing a threshold level determination based on whether the received power has reached a threshold level; and controlling a drive circuit controller based on the threshold level determination.

In a related embodiment, controlling the drive circuit controller based on the threshold level determination may include: causing a disable pin in the drive circuit controller to be coupled to ground until the produced threshold level determination indicates that the received power has reached the threshold level. In another related embodiment, the method may further include: outputting an open circuit determination based on whether an open circuit exists in the drive circuit; and controlling the drive circuit controller based on the open circuit determination. In a further related embodiment, controlling the drive circuit controller based on the open circuit determination may include: causing a disable pin in a power factor correction circuit controller to be coupled to ground when the open circuit determination indicates that an open circuit condition exists.

In still another related embodiment, the method may further include: providing a temperature determination based on whether a power factor correction (PFC) circuit in the power supply circuit is above a maximum allowed temperature; and controlling a PFC circuit controller based on the temperature determination. In a further related embodiment, controlling the PFC circuit controller based on the temperature determination may include: causing a disable pin in the PFC circuit controller to be coupled to ground until the temperature determination indicates that a temperature-sensitive circuit in the PFC circuit is at a temperature at or below the maximum allowed temperature.

BRIEF DESCRIPTION OF THE DRAWINGS

The foregoing and other objects, features and advantages disclosed herein will be apparent from the following description of particular embodiments disclosed herein, as illustrated in the accompanying drawings in which like reference characters refer to the same parts throughout the different views. The drawings are not necessarily to scale, emphasis instead being placed upon illustrating the principles disclosed herein.

DETAILED DESCRIPTION

Figure 1:
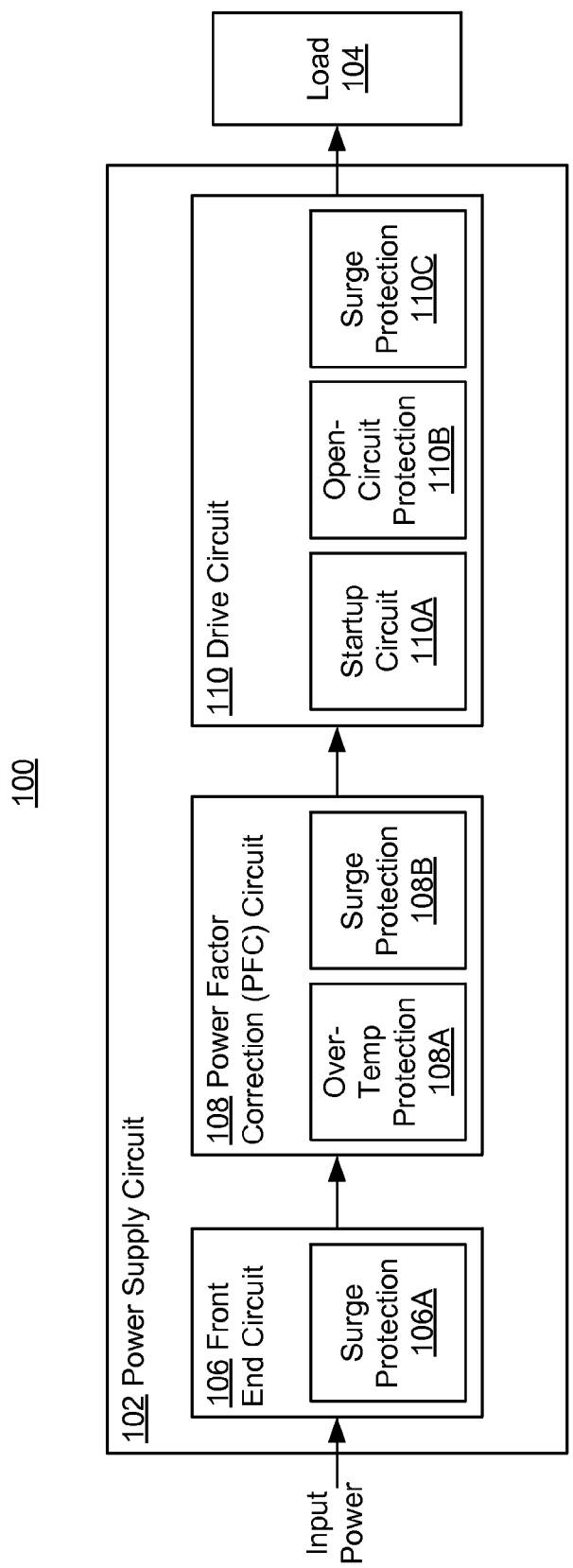
FIG. 1 shows a block diagram of a system including a power supply circuit according to embodiments disclosed herein.

FIG. 1 shows a block diagram of a power supply system 100 that includes a power supply circuit 102 and a load 104. The power supply circuit includes, in some embodiments, a front end circuit 106, a PFC circuit 108, and a drive circuit 110. The power supply circuit 102 is configured to receive input power via the front end circuit 106. Input power may, and in some embodiments does, include an AC or DC voltage supplied by various sources including, for example but not limited to, a power grid, storage cells (e.g., batteries), off-grid generation based on technologies such as solar, wind, fossil fuel, reactive chemical cells, etc. The front end circuit 106 includes a surge protection circuit 106A and is configured to receive the input power and to generate a DC voltage based on the input power. The PFC circuit 108 includes an over-temp protection circuit 108A and a surge protection circuit 108B, and is configured to generate a driving voltage based on the generated DC voltage received from the front end circuit 106. The drive circuit 110 includes a startup circuit 110A, an open-circuit protection circuit 110B, and a surge protection circuit 110C. The drive circuit 110 is configured to generate an output voltage for driving the load 104 based on the driving voltage. The load 104 is any device or group of devices configured to operate using electric power and may include, for example but not limited to, mobile communication devices (e.g., cellular handsets, smart phones, etc.), electro-mechanical devices (e.g., electric motors), light emitting devices (e.g., one or more solid state light sources, such as but not limited to light emitting diodes (LEDs), organic LEDs (OLEDs), polymer LEDs (PLEDs), and the like), computing devices, and so on.

Figure 2:
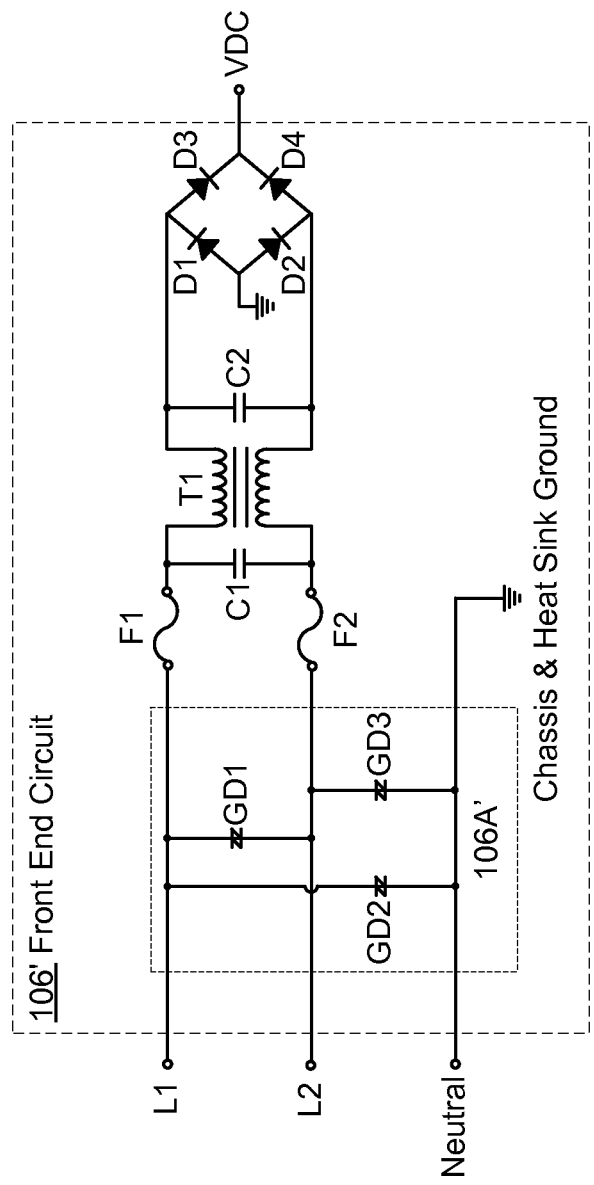
FIG. 2 illustrates a circuit diagram of a front end circuit of a power supply circuit according to embodiments disclosed herein.

FIG. 2 illustrates a circuit diagram of a front end circuit 106'. While the front end circuit 106' may be configured to receive an AC voltage input including two energized input lines and a neutral line, this configuration is merely for the sake of explanation herein. Thus, the front end circuit 106' may also be, and in some embodiments is, configured to receive other AC inputs and/or DC inputs. The input power (e.g., an AC voltage, a DC voltage, etc.) is supplied to the front end circuit 106' though a surge protection circuit 106A'. The surge protection circuit 106A' includes, in some embodiments, a number of gas discharges tubes. The surge protection circuit 106A' in FIG. 2 includes three gas discharge tubes GD1, GD2, GD3. A gas discharge tube may be, and in some embodiments is, a sealed device that contains an inert gas mixture trapped between two electrodes. The inert gas mixture normally acts as an insulator, but will conduct electric current after becoming ionized by a high voltage. During a high voltage spike, the gas discharge tube may create an effective short circuit, allowing the excess power to be safely directed to ground. In the front end circuit 106', a first gas discharge tube GD1 is arranged between input lines L1 and L2, while a second gas discharge tube GD2 is arranged between the input line L1 and ground, and a third gas discharge tube GD3 is arranged between the input line L2 and ground. In such a configuration, the gas discharge tubes GD1, GD2, GD3 safely direct the current resulting from one or more high voltage spikes (e.g., due to ESD, lightning strikes, etc.) to ground to ensure operator safety and to prevent damage to the power supply circuit 102 and/or the load 104 to which the front end circuit 106' is connected.

The front end circuit 106' also includes fuses F1 and F2, capacitors C1 and C2, a transformer T1, and diodes D1-D4. The fuses F1 and F2 provide further protection against high input currents. The capacitor C1 is configured to stabilize and/or filter the input power being fed into the transformer T1, which may be, and in some embodiments is, configured as a common mode choke to filter out conducted noise (e.g., electromagnetic interference (EMI), radio frequency interference (RFI), etc.). The high inductance of the windings in the transformer T1 is such that noise current may be cancelled or reduced. The coefficient of coupling may be, and in some embodiments is, lower than a normal transformer, which helps to reduce differential noise. The capacitor C2 further stabilizes the AC voltage prior to conversion to DC voltage. In this regard, the diodes D1-D4 are arranged as a bridge rectifier to convert the AC input voltage into a DC voltage (VDC) for a PFC circuit connected to the front end circuit 106'.

Figure 3:
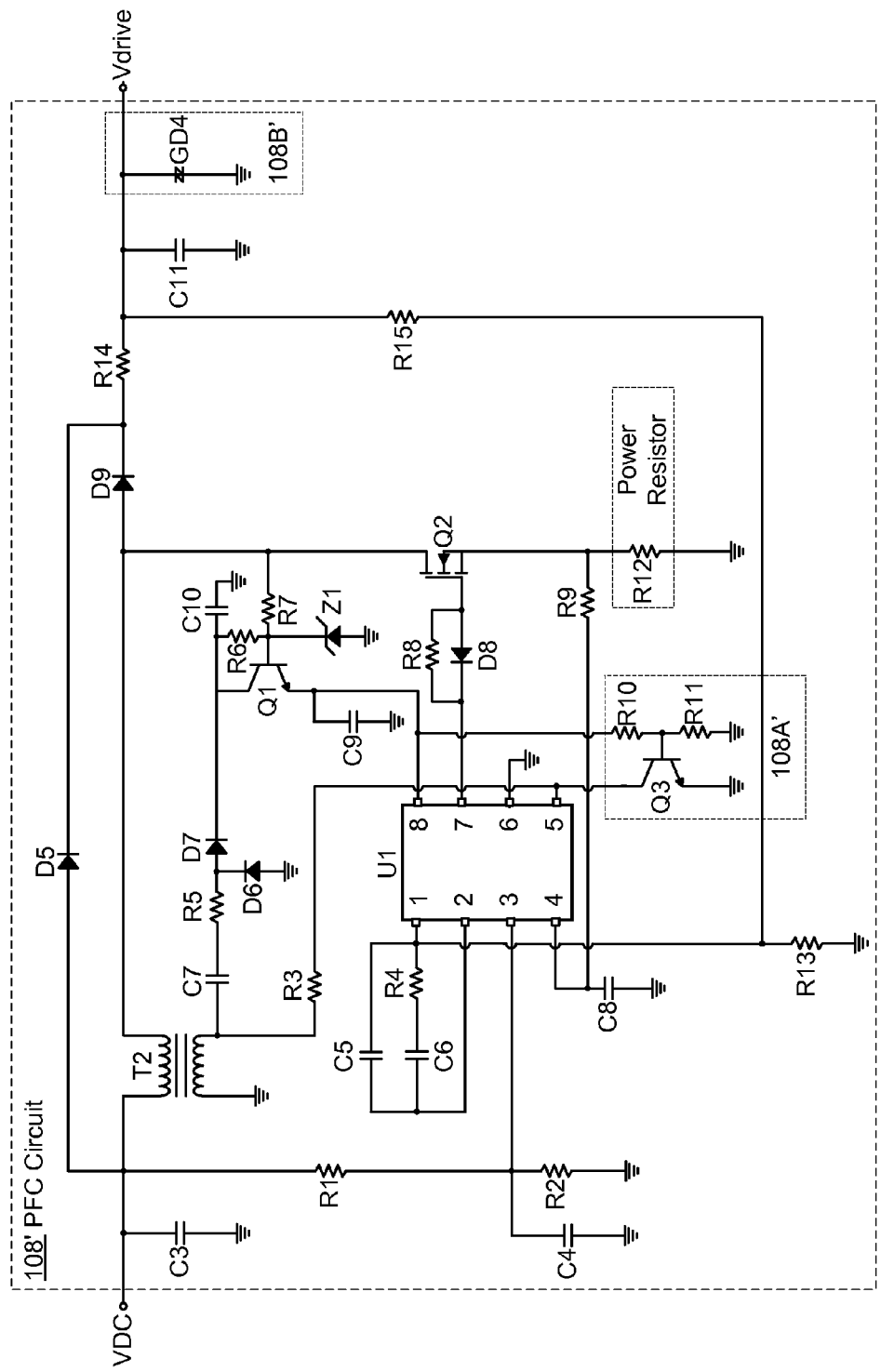
FIG. 3 illustrates a circuit diagram of a power factor correction (PFC) circuit according to embodiments disclosed herein.

FIG. 3 illustrates a circuit diagram of a PFC circuit 108'. It is important to note that while various embodiments described herein are explained in terms of a PFC flyback architecture, other DC to DC converter technologies may be, and in some embodiments are, employed. Example DC to DC converter architectures that may be, and in some embodiments are, employed include, but are not limited to, buck, boost, buck-boost, Cuk, inverting, single-ended primary-inductor converter (SEPIC), etc. The PFC circuit 108' in FIG. 3 includes capacitors C3-C11, resistors R1-R15, a transformer T2, diodes D5-D8, a zener diode Z1, transistors Q1-Q3, a gas discharge tube GD4 and a controller U1. The PFC circuit 108' may be configured to perform power factor correction on the DC voltage VDC to maximize the amount of active (useful) power available to a drive circuit of the power supply circuit, such as the drive circuit 110 of the power supply circuit 102 shown in FIG. 1, thus improving the overall efficiency of the power supply circuit. The controller U1 is configured to control the PFC circuit 108'. In some embodiments, components connected to and/or near the controller U1 in the PFC circuit 108' vary depending on type of controller. For the sake of example herein, the controller U1 of FIG. 3 is an L6562 Transition Mode PFC controller manufactured by ST Microelectronics Inc, though of course any other controller may be, and in some embodiments is, used.

Initially, the capacitor C3 is configured to stabilize and/or filter the DC voltage VDC, which is reduced via a voltage divider including the resistors R1 and R2, and generates a current for a charging capacitor C4. The voltage of the charging capacitor C4 is then supplied to pin 3 of the controller U1 (e.g., in the instance of an L6562, the main multiplier input). The DC voltage VDC is also supplied to the transformer T2, which steps down the DC voltage VDC prior to the resistor R3, resulting in current flowing to pin 5 of the controller U1 (e.g., in the instance of an L6562, the zero current detector). The reduced voltage from the transformer T2 is also provided to the capacitor C7, which causes current to flow through the resistor R5. The diodes D6 and D7 are configured to control the amount of current allowed to flow to a charge capacitor C10. The transistor Q1 is controlled based on the difference between the DC voltage VDC and the voltage of the charge capacitor C10 (e.g., through the resistors R6 and R7 with overcurrent protection provided by the zener diode Z1) to allow current to charge the capacitor C9. The voltage across the capacitor C9 is supplied to pin 8 of the controller U1 (e.g., in the instance of an L6562, VCC). The diodes D5 and D9 are configured to cause current to flow through the resistor R14 (e.g., as opposed to flowing back into the input where the DC voltage VDC is received, or into the transformer T2). The resistors R4, R13 and R15, and the capacitors C4 and C6 form an error amplifier coupled to pins 1 and 2 of the controller U1 (e.g., in the instance of an L6562, the inverting input and error amplifier output, respectively). The error amplifier serves as a compensation network to achieve stability in the voltage control loop and to ensure high power factor and low total harmonic distortion (THD). In some embodiments, the values of these components are selected to set a particular cutoff frequency, such as but not limited to 20 Hz and/or substantially 20 Hz, to ensure a high power factor. A driving voltage Vdrive output by the PFC circuit 108' is controlled by the output of pin 7 of the controller U1 (e.g., in the instance of an L6562, the gate driver output), which is coupled to a gate of the transistor Q2 (e.g., an n-channel MOSFET) through an RC network comprising the resistor R8 and the diode D8. The controller U1 is configured to drive the transistor Q2 to charge the capacitor C11 based on an internally generated pulse width modulation (PWM) signal. Feedback is provided to the controller U1 through the resistors R9 and R12, which charge the capacitor C8. The capacitor C8 is coupled to pin 4 of the controller U1 (e.g., in the instance of an L6562, the current sense pin). Pin 6 of the controller U1 is coupled to ground.

In some embodiments, additional features are provided to protect against over-temperature situations and power surges. Over-temperature protection circuit 108A', shown in FIG. 3, is configured to disable the controller U1 when the temperature experienced by a temperature-sensitive component in the over-temperature protection circuit 108A' increases over a maximum allowed temperature. The over-temperature protection circuit 108A' includes the resistors R10-R11 and the transistor Q3. The resistor R10 is a thermistor or another component having a resistance that varies with temperature. If the resistance of the resistor R10 decreases as its temperature increases, the voltage at a gate of the transistor Q3 (e.g., a bipolar junction transistor) will increase as the temperature increases. When the temperature increases past the maximum allowed temperature (e.g., determined by the characteristics of the resistor R10), the transistor Q3 will turn on and couple pin 5 of the controller U1 (e.g., the zero current detector pin) to ground. Coupling pin 5 to ground will disable the controller U1, and likewise, the PFC circuit 108'. As a result, a power supply circuit of which the PFC circuit 108' is a part is safely disabled whenever the over-temperature protection circuit 108A' experiences a temperature above a maximum allowed temperature. In some embodiments, a surge protection circuit 108B' is configured to protect the PFC circuit 108' from power surges (e.g., due to ESD, lighting strikes, etc.). The surge protection circuit 108B' includes, for example, a gas discharge tube GD4. The gas discharge tube GD4 is configured to divert large currents to ground instead of flowing out to a drive circuit connected to the PFC circuit 108', such as but not limited to the drive circuit 110 shown in FIG. 1 or a drive circuit 110' shown in FIG. 4.

Figure 4:
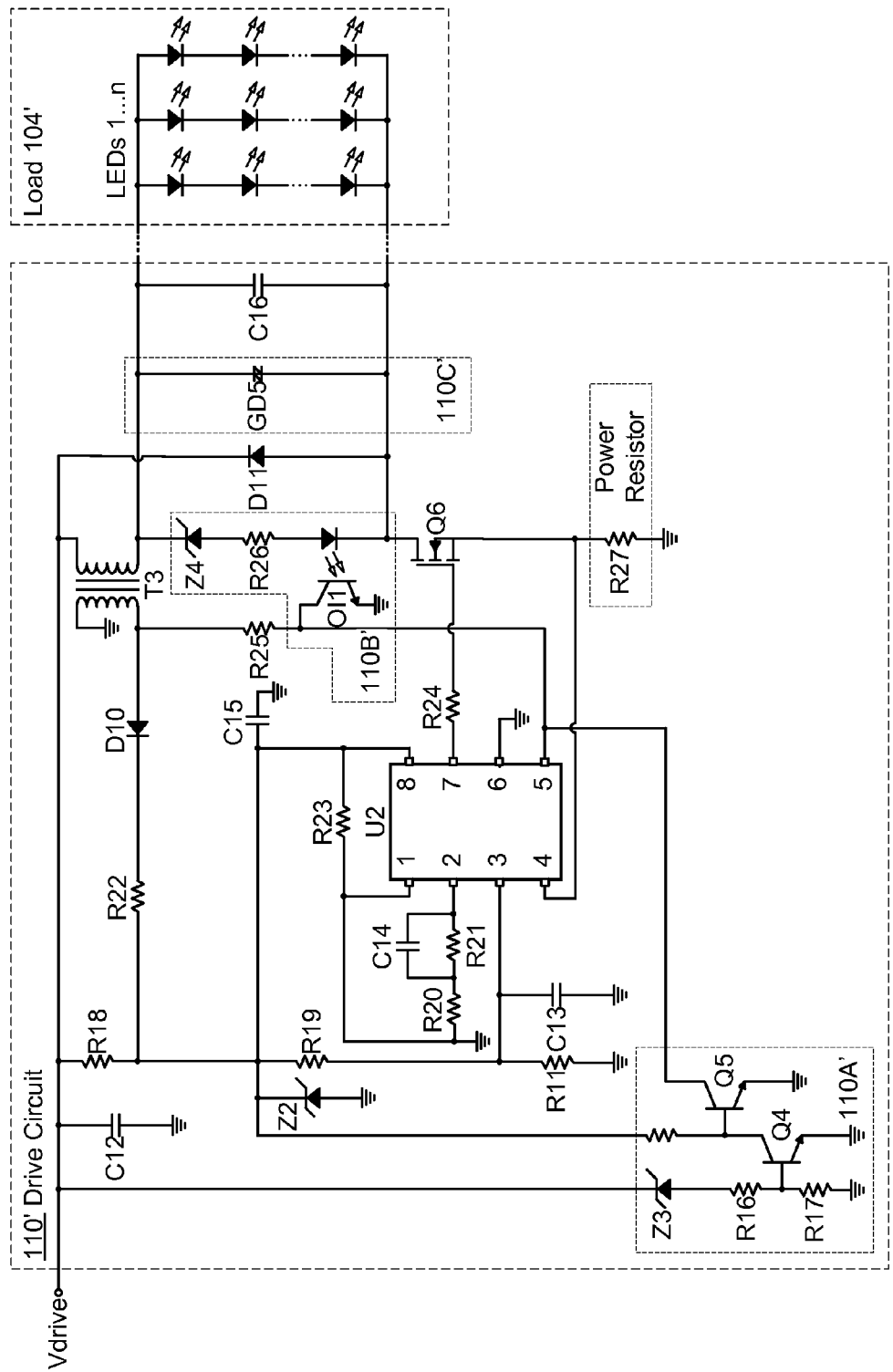
FIG. 4 illustrates a circuit diagram of a drive circuit according to embodiments disclosed herein.

FIG. 4 illustrates a circuit diagram of the drive circuit 110' and a load 104'. The drive circuit 110' includes capacitors C12-C16, resistors R16-R27, zener diodes Z2-Z4, transistors Q4-Q6, an optoisolator OH, a transformer T3, and a controller U2. In some embodiments, the components surrounding the controller U2 vary depending on the type of controller selected. In some embodiments, the controller U2 is configured in the same way as the controller U1 of the PFC circuit 108' shown in FIG. 3 and in some embodiments the controller U2 has the same pin-out as the controller U1 (e.g., the controller U2 in some embodiments is also an L6562 Transition Mode PFC controller manufactured by ST Microelectronics Inc.). At least one benefit that may be realized from the controller U1 and the controller U2 being the same component is cost savings due to component commonality; because the same component may be used twice, larger component quantities may be purchased at lower cost.

For the sake of explanation, the drive circuit 110' in FIG. 4 is illustrated in a flyback configuration. The controller U2 is configured to turn on the transistor Q6, causing current to flow through the transformer T3 until it reaches a peak amount set by the controller U2. The peak amount is a level determined by a DC bias on pins 1 and 3 of the controller U2. After the transistor Q6 turns off, an output current begins to flow through the diode D11, until all of the energy in the transformer T3 is expended. Upon reaching this condition, the secondary winding in the transformer T3 produces a negative transition, which the controller U2 uses to initiate another cycle. The capacitor C16 is configured to store energy to be released to the load 104' during the time that the transistor Q3 is in the off state. In instances where a L6562 controller is employed, at startup the controller U2 operates in a burst mode to initiate the flow of energy to the output. As the output increases, the secondary winding of the transformer T3 starts to provide regulated power to the controller U2. The current through the transistor Q6 is regulated by a multiplier circuit within the controller U2. The output power to the load 104' is set through selection of the components in the feedback loop coupled to pin 4 of the controller U2.

The driving voltage Vdrive is provided to the capacitor C12, which is configured to provide voltage stabilization and/or filtering. The resistors R11, R18 and R19 are configured to generate a charging current for the capacitor C15, which provides the voltage VCC to pin 8 of the controller U2. The Zener diode Z2 provides overcurrent protection for the capacitor C15. The voltage generated by the capacitor C15 is used to power a compensation network including the resistors R20, R21 and R23, and the capacitor C14. The compensation network is coupled between pins 1 and 2 of the controller U2. Some current also flows from the resistor R19 into the capacitor C13, which provides a voltage to pin 3 of the controller U2. The resistor R22 provides a current based on the driving voltage Vdrive to a primary winding of the transformer T3 through the diode D10 (e.g., configured to prevent current from flowing back into the resistor R22). As described above, the controller U2 is configured to drive the transistor Q6 (e.g., an n-channel MOSFET), which causes the transistor Q6 to charge and then discharge (e.g., "flyback") through the diode D11. The transistor Q6 provides feedback to pin 4 of the controller U2. The resistor R25 is configured to provide a current to pin 5 of the controller U2.

In some embodiments, additional features are provided to protect a power supply circuit and a load to which the drive circuit 110' is connected, such as but not limited to the power supply circuit 102 and the load 104 shown in FIG. 1, from possibly hazardous situations. For example, at certain times the driving voltage Vdrive may be unstable (e.g., during startup of a power supply circuit, during temporary power drops or "brown-outs," etc.). Even though the controller U2 may have enough voltage bias to start switching, a startup circuit 110A' is configured to disable the controller U2 until the driving voltage Vdrive again stabilizes. The startup circuit 110A' includes, in some embodiments, the zener diode Z3, the resistors R16-R17, and the transistors Q4-Q5. During operation, the transistor Q5 keeps pin 5 of the controller U2 coupled to ground, disabling the controller U2, until the driving voltage Vdrive crosses a certain voltage threshold determined by the voltage drop across the Zener diode Z3. After the driving voltage Vdrive crosses the voltage threshold, a voltage may appear at a gate of the transistor Q4, causing it to conduct, and thus, coupling a gate of the transistor Q5 to ground. The gate of the transistor Q5 going low causes it to turn off and severs the connection between pin 5 of the controller U2 and ground, allowing the controller U2 to start up. In some embodiments, an open-circuit protection circuit 110B' is configured to disable the controller U2 upon the occurrence of an open circuit across the load connected to the drive circuit 110', such as but not limited to the load 104' shown in FIG. 4. The open-circuit protection circuit 110B' includes the zener diode Z4, the resistor R26, and the optoisolator OH. Upon the occurrence of an open circuit across the load, the current generated by the transformer T3 has nowhere to go, causing the Zener diode Z4 to break down. The breakdown of the Zener diode Z4 results in current flowing through the resistor R26 and an emitter of the optoisolator OH. The emitter of the optoisolator OH then produces light sensed by a photo sensor of the optoisolator OH, which causes pin 5 of the controller U2 to be coupled to ground, disabling the controller U2. The controller U2 remains disabled (e.g., pin 5 continues to be coupled to ground) until the open circuit is resolved. The startup circuit 110A' and/or the open-circuit protection circuit 110B' are, in some embodiments, used alone, and in some embodiments, are used in conjunction with a surge protection circuit 110C'. The surge protection circuit 110C' includes a gas discharge tube GD5. The gas discharge tube GD5 is configured to divert large currents to ground instead of flowing out to the load connected to the drive circuit 110'. As shown in FIG. 4, the load 104' includes multiple solid state light sources LEDs 1 . . . n. While the load 104' is shown as containing multiple solid state light sources LEDs 1 . . . n, this is merely for the sake of example herein, and is not intended to limit embodiments to only solid state light source-related uses.

In some embodiments, the power output of the power supply circuit 102 is scalable without the requirement of total redesign. The output power of the power supply circuit 102 is increased or decreased by changing components (e.g., "power resistors") in the feedback loop of the controller (for example but not limited to the controller U1 shown in FIG. 3) in a PFC circuit of the power supply circuit (such as but not limited to the PFC circuit 108' shown in FIG. 3) and the controller (for example but not limited to the controller U2 shown in FIG. 4) in a drive circuit of the power supply circuit (such as but not limited to the drive circuit 110' shown in FIG. 4). For example, with reference to FIGS. 3 and 4, changing the values of the resistor R12 in the PFC circuit 108' and/or the resistor R27 in the drive circuit 110' allows the output of the power supply circuit including one or both of those circuits to be increased or decreased according to, for example, the requirements of the load connected thereto. This scaling may be performed without changing other components in the power supply circuit, and thus, a substantial redesign may be avoided.

Figure 5:
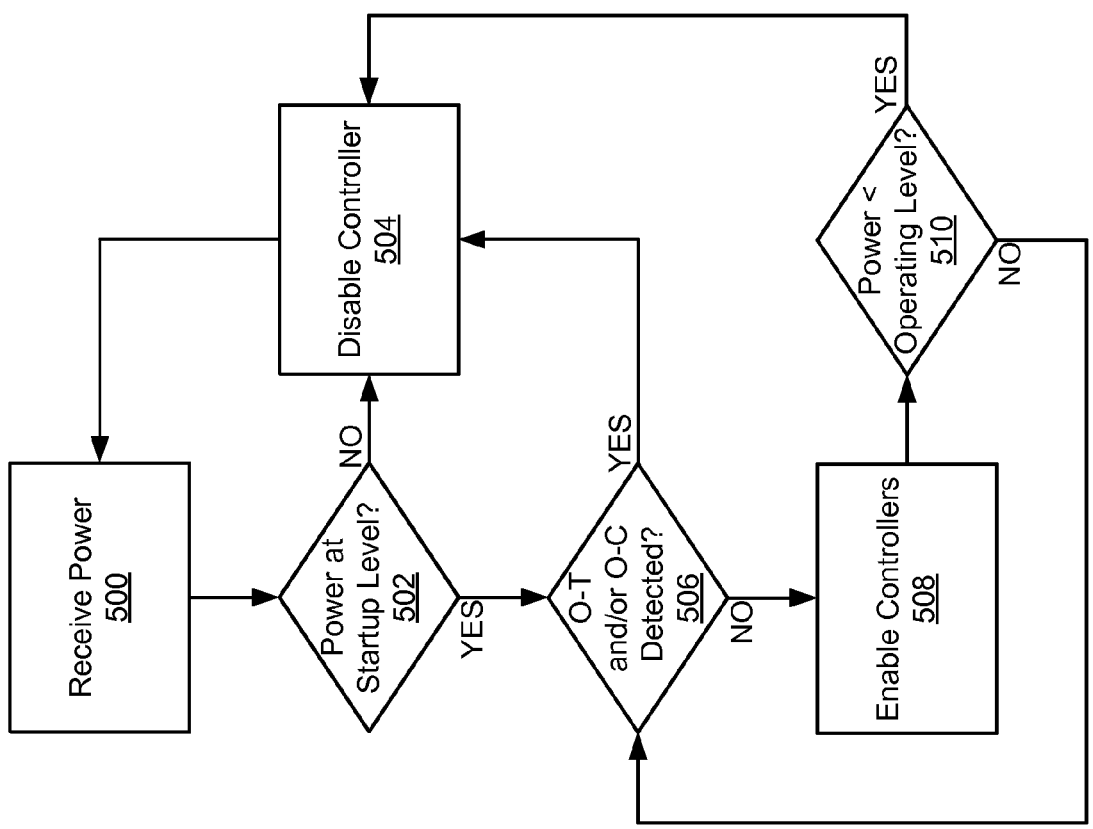
FIG. 5 illustrates a flowchart of operations for a scalable power supply circuit including protection features according to embodiments disclosed herein.

FIG. 5 illustrates a flowchart of example operations for a scalable power supply circuit including protection features, such as but not limited to the power supply circuit 102 and its various components described above in regards to FIGS. 1-4. Power is received in the power supply circuit in operation 500. A determination is then made in operation 502 as to whether the power is at a threshold level, such as but not limited to a startup level. The startup level is determined based on, for example, a minimum power level needed for the power supply circuit to operate safely, reliably, etc. If it is determined in operation 502 that the power is not at the threshold level, then in operation 504 a controller in the power supply circuit is disabled. Operations 500 to 502 may cycle until the power received by the power supply circuit reaches the threshold level (e.g., the startup level). After the power is at the threshold level, another determination is made in operation 506 as to whether an over-temperature (O-T) and/or open-circuit (O-C) situation exists in the power supply circuit. If in operation 506 at least one of an O-T situation or an O-C situation is determined to exist, then a controller of the power supply circuit is disabled in operation 504. Alternatively, if no O-T or O-C situation is determined to exist, then in operation 508 one or more controllers of the power supply circuit are enabled, and the power supply circuit is allowed to initiate operation. A determination is then made in operation 510 as to whether the power has dropped below a required operating level (e.g., due to the circuit being deactivated, a "brown-out", etc.). If it is determined that the power level has dropped below the required operating level, then in operation 504 a controller of the power supply circuit is disabled. Otherwise, in operation 506, the power supply circuit continues to monitor for the existence of O-T and/or O-C situations, and thus the power supply circuit continues to operate by supplying output power to a load connected thereto.

While FIG. 5 illustrates various operations according to a particular embodiment, it is to be understood that not all of the operations depicted in FIG. 5 are necessary for other embodiments. Indeed, it is fully contemplated herein that in other embodiments, the operations depicted in FIG. 5, and/or other operations described herein are combined in a manner not specifically shown in any of the drawings, but still fully within the scope of the invention. Thus, claims directed to features and/or operations that are not exactly shown in FIG. 5 are deemed within the scope and content of the present disclosure.

The methods and systems described herein are not limited to a particular hardware or software configuration, and may find applicability in many computing or processing environments. The methods and systems may be implemented in hardware or software, or a combination of hardware and software. The methods and systems may be implemented in one or more computer programs, where a computer program may be understood to include one or more processor executable instructions. The computer program(s) may execute on one or more programmable processors, and may be stored on one or more storage medium readable by the processor (including volatile and non-volatile memory and/or storage elements), one or more input devices, and/or one or more output devices. The processor thus may access one or more input devices to obtain input data, and may access one or more output devices to communicate output data. The input and/or output devices may include one or more of the following: Random Access Memory (RAM), Redundant Array of Independent Disks (RAID), floppy drive, CD, DVD, magnetic disk, internal hard drive, external hard drive, memory stick, solid state memory including solid state disk drives and flash drives, memory storage cards such as but not limited to Secure Digital (SD) cards, embedded multimedia cards (eMMCs), secure digital input/output (SDIO) cards, magnetic or optical cards, and the like, or other storage device capable of being accessed by a processor as provided herein, where such aforementioned examples are not exhaustive, and are for illustration and not limitation.

The computer program(s) may be implemented using one or more high level procedural or object-oriented programming languages to communicate with a computer system; however, the program(s) may be implemented in assembly or machine language, if desired. The language may be compiled or interpreted.

As provided herein, the processor(s) may thus be embedded in one or more devices that may be operated independently or together in a networked environment, where the network may include, for example, a Local Area Network (LAN), wide area network (WAN), and/or may include an intranet and/or the internet and/or another network. The network(s) may be wired or wireless or a combination thereof and may use one or more communications protocols to facilitate communications between the different processors. The processors may be configured for distributed processing and may utilize, in some embodiments, a client-server model as needed. Accordingly, the methods and systems may utilize multiple processors and/or processor devices, and the processor instructions may be divided amongst such single- or multiple-processor/devices.

The device(s) or computer systems that integrate with the processor(s) may include, for example, a personal computer(s), workstation(s) (e.g., Sun, HP), personal digital assistant(s) (PDA(s)), handheld device(s) such as cellular telephone(s) or smart cellphone(s) (also known as smartphones), mobile device(s), laptop(s), handheld computer(s), tablet(s), or another device(s) capable of being integrated with a processor(s) that may operate as provided herein. Accordingly, the devices provided herein are not exhaustive and are provided for illustration and not limitation.

References to "a microprocessor" and "a processor", or the "microprocessor" and "the processor," may be understood to include one or more microprocessors that may communicate in a stand-alone and/or a distributed environment(s), and may thus be configured to communicate via wired or wireless communications with other processors, where such one or more processor may be configured to operate on one or more processor-controlled devices that may be similar or different devices. Use of such "microprocessor" or "processor" terminology may thus also be understood to include a central processing unit, an arithmetic logic unit, an application-specific integrated circuit (IC), and/or a task engine, with such examples provided for illustration and not limitation.

Furthermore, references to memory, unless otherwise specified, may include one or more processor-readable and accessible memory elements and/or components that may be internal to the processor-controlled device, external to the processor-controlled device, and/or may be accessed via a wired or wireless network using a variety of communications protocols, and unless otherwise specified, may be arranged to include a combination of external and internal memory devices, where such memory may be contiguous and/or partitioned based on the application. Accordingly, references to a database may be understood to include one or more memory associations, where such references may include commercially available database products (e.g., SQL, Informix, Oracle) and also proprietary databases, and may also include other structures for associating memory such as links, queues, graphs, trees, with such structures provided for illustration and not limitation.

References to a network, unless provided otherwise, may include one or more intranets and/or the internet. References herein to microprocessor instructions or microprocessor-executable instructions, in accordance with the above, may be understood to include programmable hardware.

A "circuit" or "circuitry" may include, singly or in any combination, hardwired circuitry, programmable circuitry, state machine circuitry, and/or firmware that stores instructions executed by programmable circuitry.

Unless otherwise stated, use of the word "substantially" may be construed to include a precise relationship, condition, arrangement, orientation, and/or other characteristic, and deviations thereof as understood by one of ordinary skill in the art, to the extent that such deviations do not materially affect the disclosed methods and systems.

Throughout the entirety of the present disclosure, use of the articles "a" and/or an and/or the to modify a noun may be understood to be used for convenience and to include one, or more than one, of the modified noun, unless otherwise specifically stated. The terms "comprising", "including" and "having" are intended to be inclusive and mean that there may be additional elements other than the listed elements.

Elements, components, modules, and/or parts thereof that are described and/or otherwise portrayed through the figures to communicate with, be associated with, and/or be based on, something else, may be understood to so communicate, be associated with, and or be based on in a direct and/or indirect manner, unless otherwise stipulated herein. The term "coupled" as used herein refers to any connection, coupling, link or the like by which signals carried by one system element are imparted to the "coupled" element. Such "coupled" devices, or signals and devices, are not necessarily directly connected to one another and may be separated by intermediate components or devices that may manipulate or modify such signals. Likewise, the terms "connected" or "coupled" as used herein in regard to mechanical or physical connections or couplings is a relative term and does not require a direct physical connection.

Although the methods and systems have been described relative to a specific embodiment thereof, they are not so limited. Obviously many modifications and variations may become apparent in light of the above teachings. Many additional changes in the details, materials, and arrangement of parts, herein described and illustrated, may be made by those skilled in the art.

What is claimed is:

1. A power supply circuit comprising:
   a front end circuit configured to generate a direct-current (DC) voltage based on an input voltage, wherein the front end circuit includes a first surge protection circuit;
   a power factor correction (PFC) circuit configured to generate a driving voltage based on the DC voltage, wherein the PFC circuit includes a second surge protection circuit and an over-temperature protection circuit; and
   a drive circuit configured to generate an output voltage for a load based on the driving voltage, wherein the drive circuit includes a third surge protection circuit, a startup circuit, and an open-circuit protection circuit.

2. The power supply circuit of claim 1, wherein the first surge protection circuit, the second surge protection circuit, and the third surge protection circuit each comprise one or more gas discharge tubes.

3. The power supply circuit of claim 2, wherein the input voltage is an alternating current (AC) voltage, and wherein the one or more gas discharge tubes are configured to couple a first input line voltage to a second input line voltage and each of the first input line voltages and the second input line voltages to ground.

4. The power supply circuit of claim 2, wherein the one or more gas discharge tubes in the PFC circuit are configured to prevent surges in the drive voltage and the one or more gas discharge tubes in the drive circuit are configured to prevent surges in the output voltage.

5. The power supply circuit of claim 1, wherein the over-temperature protection circuit is configured to disable the PFC circuit when a temperature associated with the over-temperature protection circuit increases above a maximum allowed temperature.

6. The power supply circuit of claim 5, wherein the over-temperature protection circuit comprises a temperature-sensitive component and a transistor, wherein the temperature-sensitive component is configured to cause the transistor to couple a disable input of a controller in the PFC circuit to ground when the temperature-sensitive component is at a temperature above the maximum allowed temperature.

7. The power supply circuit of claim 1, wherein the startup circuit is configured to prevent activation of the drive circuit until the driving voltage reaches a threshold voltage.

8. The power supply circuit of claim 7, wherein the startup circuit comprises a diode and a transistor, and wherein the diode is configured to cause the transistor to couple a disable input of a controller in the drive circuit to ground until the driving voltage reaches the threshold voltage.

9. The power supply circuit of claim 1, wherein the open-circuit protection circuit is configured to disable the drive circuit when an open circuit is detected across the load.

10. The power supply circuit of claim 9, wherein the open-circuit protection circuit comprises a diode and an optical isolator, and wherein the diode is configured to cause the optical isolator to couple a disable input of a controller in the drive circuit to ground when an open circuit is detected across the load.

11. The power supply circuit of claim 1, wherein the PFC circuit and the drive circuit each include a controller component.

12. The power supply circuit of claim 11, wherein the controller component in the PFC circuit and the controller component in the drive circuit are each configured the same and each have the same pin-out configuration.

13. A method, comprising:
   receiving power in a power supply circuit, wherein the power supply circuit includes a drive circuit;
   producing a threshold level determination based on whether the received power has reached a threshold level;
   controlling a drive circuit controller based on the threshold level determination;
   outputting an open circuit determination based on whether an open circuit exists in the drive circuit; and
   controlling the drive circuit controller based on the open circuit determination; wherein controlling the drive circuit controller based on the threshold level determination comprises:
   causing a disable in the drive circuit controller to be coupled to ground until the produced threshold level determination indicates that the received power has reached the threshold level.

14. The method of claim 13, wherein controlling the drive circuit controller based on the open circuit determination comprises:
   causing a disable pin in a power factor correction circuit controller to be coupled to ground when the open circuit determination indicates that an open circuit condition exists.

15. The method of claim 13, further comprising:
   providing a temperature determination based on whether a power factor correction (PFC) circuit in the power supply circuit is above a maximum allowed temperature; and
   controlling a PFC circuit controller based on the temperature determination.

16. The method of claim 15, wherein controlling the PFC circuit controller based on the temperature determination comprises:
   causing a disable pin in the PFC circuit controller to be coupled to ground until the temperature determination indicates that a temperature-sensitive circuit in the PFC circuit is at a temperature at or below the maximum allowed temperature.

* * * * *